United States Patent
Berger et al.

(10) Patent No.: US 12,385,519 B2
(45) Date of Patent: Aug. 12, 2025

(54) BALL JOINT FOR A CHASSIS OF A VEHICLE, AND METHOD FOR PRODUCING SUCH A BALL JOINT

(71) Applicant: ZF Friedrichshafen AG, Friedrichshafen (DE)

(72) Inventors: Artur Berger, Bohmte (DE); Thomas Richter, Damme (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 271 days.

(21) Appl. No.: 18/000,947

(22) PCT Filed: May 5, 2021

(86) PCT No.: PCT/EP2021/061855
§ 371 (c)(1),
(2) Date: Dec. 7, 2022

(87) PCT Pub. No.: WO2021/249701
PCT Pub. Date: Dec. 16, 2021

(65) Prior Publication Data
US 2023/0220871 A1    Jul. 13, 2023

(30) Foreign Application Priority Data

Jun. 9, 2020   (DE) .................. 10 2020 207 191.8

(51) Int. Cl.
*F16C 11/06*   (2006.01)
(52) U.S. Cl.
CPC ...... *F16C 11/0642* (2013.01); *F16C 11/0633* (2013.01); *F16C 11/0647* (2013.01); *F16C 11/069* (2013.01); *Y10T 403/32737* (2015.01)
(58) Field of Classification Search
CPC .............. F16C 11/0619; F16C 11/0623; F16C 11/0638; F16C 11/0642; F16C 11/0647;
(Continued)

(56) References Cited

U.S. PATENT DOCUMENTS 3,305,617 A * 2/1967 Dumpis ................. B60G 7/005
  264/254
4,626,121 A * 12/1986 Tajima ................. F16C 11/086
  403/138
(Continued)

FOREIGN PATENT DOCUMENTS

DE        10110738 C1 * 11/2002 ........... B60G 17/019
DE   10 2016 215 416 A1    2/2018
(Continued)

OTHER PUBLICATIONS

European Patent Office, International Search Report issued in International patent application No. PCT/EP2021/061855 (Dec. 22, 2021).

(Continued)

*Primary Examiner* — Amber R Anderson
*Assistant Examiner* — Kevin J Baynes
(74) *Attorney, Agent, or Firm* — Finch & Maloney PLLC (57) ABSTRACT

A ball joint (1, 37) for a chassis of a vehicle has an inner joint portion (4) and a one-piece slide bearing (10) made of plastic. A joint ball (35) of the inner joint portion (4) is fitted so that it can swivel in a ball-bearing section (16). The slide bearing (10) has a holding section (12, 38) for the arrangement of a sensor element (13, 39). In order to simplify the structure and/or assembly of the ball joint (1, 37), the outside of the slide bearing (10) has a circular-ring-shaped contact surface (20) which is formed coaxially relative to a central longitudinal axis (19) of the slide bearing (10) and which co-operates with a separate closure ring (9) surrounding the outside of the slide bearing (10) to fix the slide bearing (10) in a joint housing (3).

14 Claims, 9 Drawing Sheets

(58) Field of Classification Search
CPC .............. F16C 11/0657; F16C 11/0666; F16C 11/0671; F16C 11/0676; F16C 11/0685; F16C 11/069; F16C 11/106; F16C 2226/74; B60G 7/005; B60G 2204/416; Y10T 403/32737
See application file for complete search history.

(56) References Cited

U.S. PATENT DOCUMENTS

| | | | | |
|---|---|---|---|---|
| 4,679,957 | A * | 7/1987 | Bauer | F16C 11/0619 403/115 |
| 4,758,110 | A * | 7/1988 | Ito | F16C 33/20 403/140 |
| 4,986,689 | A * | 1/1991 | Drutchas | F16C 11/106 403/135 |
| 5,070,609 | A * | 12/1991 | Teramachi | F16C 11/0604 29/434 |
| 5,626,433 | A * | 5/1997 | Iwamoto | F16C 7/02 403/135 |
| 6,202,280 | B1 * | 3/2001 | Parker | F16C 11/0642 29/441.1 |
| 6,821,047 | B2 * | 11/2004 | Broker | F16C 11/0685 403/138 |
| 7,048,461 | B2 * | 5/2006 | Williams | F16C 11/0647 403/135 |
| 7,063,480 | B2 * | 6/2006 | Ersoy | B60G 17/019 403/135 |
| 7,170,285 | B2 * | 1/2007 | Spratte | G01D 5/145 324/207.21 |
| 7,367,742 | B2 * | 5/2008 | Brunneke | F16C 11/0647 403/135 |
| 7,405,557 | B2 * | 7/2008 | Spratte | B60G 7/005 324/261 |
| 7,695,212 | B2 * | 4/2010 | Spratte | B60G 17/019 403/135 |
| 7,762,736 | B2 | 7/2010 | Ersoy et al. | |
| 7,841,799 | B2 * | 11/2010 | Spratte | F16C 11/0642 403/130 |
| 8,079,578 | B2 * | 12/2011 | Bumgarner | B23Q 1/035 269/21 |
| 8,151,464 | B2 * | 4/2012 | Orend | B29C 66/135 29/521 |
| 8,342,560 | B2 * | 1/2013 | Albers | B60D 1/065 280/511 |
| 8,684,621 | B2 * | 4/2014 | Forthaus | F16C 11/0638 403/135 |
| 8,753,032 | B2 * | 6/2014 | Yu | F16C 11/0647 403/90 |
| 9,476,447 | B2 * | 10/2016 | Schmidt | B60G 7/005 |
| 9,518,602 | B2 * | 12/2016 | Forthaus | F16C 11/0647 |
| 2005/0207830 | A1 * | 9/2005 | Brunneke | F16C 11/0647 403/122 |
| 2006/0029461 | A1 * | 2/2006 | Benick | F16C 11/0647 403/122 |
| 2007/0059091 | A1 | 3/2007 | Spratte et al. | |
| 2008/0193207 | A1 * | 8/2008 | Kruse | F16C 11/0647 700/13 |
| 2008/0199247 | A1 | 8/2008 | Spratte et al. | |
| 2008/0315867 | A1 * | 12/2008 | Spratte | F16C 11/0647 324/207.13 |
| 2009/0238636 | A1 * | 9/2009 | Howe | F16C 11/069 403/127 |
| 2022/0170504 | A1 | 6/2022 | Kramer et al. | |

FOREIGN PATENT DOCUMENTS

| | | | |
|---|---|---|---|
| DE | 10 2018 215 172 A1 | 3/2020 | |
| FR | 3036751 A1 * | 12/2016 | ............. B60G 7/005 |
| JP | 62017421 A * | 1/1987 | ......... F16C 11/0647 |
| JP | S62-17421 | 1/1987 | |
| KR | 2005-0022159 | 3/2005 | |
| WO | WO-2018087705 A1 * | 5/2018 | ............. B60G 7/005 |

OTHER PUBLICATIONS

European Patent Office, Written Opinion issued in International patent application No. PCT/EP2021/061855 (Dec. 22, 2021).
German Patent Office, Office Action issued in German application No. 10 2020 207 191.8 (Jan. 23, 2024).

* cited by examiner

BALL JOINT FOR A CHASSIS OF A VEHICLE, AND METHOD FOR PRODUCING SUCH A BALL JOINT

RELATED APPLICATIONS

This application claims the benefit under 35 U.S.C. § 371 as a U.S. National Application of application no. PCT/EP2021/061855, filed on 5 May 2021, which claims the benefit of German Patent Application no. 10 2020 207 191.8 filed 9 Jun. 2020, the contents of which are hereby incorporated herein by reference in their entireties.

FIELD OF THE DISCLOSURE

The invention relates to a ball joint for a chassis of a vehicle, having an inner joint portion and a one-piece slide bearing made of plastic, wherein a joint ball of the inner joint portion is fitted into a spherical bearing section of the slide bearing in such manner that it can swivel, and the slide bearing has a holding section for the arrangement of a sensor element. In addition, the invention relates to a method for producing a ball joint of that type.

BACKGROUND

Such a ball joint is known from DE 10 2019 204 659 A1. In that case the ball joint comprises a closure element with a number of perforations. The plastic material that forms the slide bearing extends through the metallic closure element. In that way a hybrid component with the metallic closure element and the plastic slide bearing is formed.

SUMMARY

This has the disadvantage that to produce the closure element with its plurality of perforations entails effort and cost.

The purpose of the present invention further is to develop a ball joint and/or a method of the type mentioned at the outset, in such manner that the structure and/or assembly of the ball joint is simplified. Preferably as many standard components as possible should be used, for example an ordinary closure ring, and/or customary assembly steps for producing the ball joint. Furthermore, it is desirable that a specified orientation of the sensor element relative to the joint housing and/or the inner joint portion can be arranged more easily, reliable and/or more reproducibly. In particular, an alternative embodiment should be provided.

The objective on which the invention is based is achieved by a ball joint and method according to the present disclosure. Preferred further developments of the invention can be found in the claims and in the description which follows.

The ball joint is designed for a chassis of a vehicle, in particular a motor vehicle. Preferably, the ball joint is part of a chassis and/or a chassis component. In automotive engineering, ball joints are used in many ways. In particular, in the chassis ball joints are used for the articulated connection of chassis components such as steering components, wheel carriers, track rods, or the like to one another or to the vehicle body or to an axle support attached thereto.

The ball joint comprises an inner joint portion. The inner joint portion can for example be in the form of a ball stud or a ball sleeve. In addition, the ball joint comprises a slide bearing. The slide bearing is integral and is made of plastic. In this case a joint ball of the inner joint portion is fitted and can swivel in a ball-bearing section of the slide bearing. The slide bearing and/or ball-bearing section can be made open on at least one side. The slide bearing, in particular the ball-bearing section of the slide bearing, can be arranged between the inner joint portion and a joint housing, in particular a recess of the joint housing. The joint housing recess can be in the form of a through-going opening in the joint housing and/or in a chassis component. Preferably, the inner joint portion or the joint ball is in sliding contact with the slide bearing, in particular the ball-bearing section thereof. In addition, the slide bearing has a holding section for the arrangement, in particular the fixing, of a sensor element. On its outside the slide bearing has a circular ring-shaped contact surface which is formed coaxially relative to a central longitudinal axis of the slide bearing and which co-operates, in the axial direction relative to the central longitudinal axis, with a separate closure ring that extends around the outside of the slide bearing for fixing the slide bearing in a joint housing.

Here, it is advantageous that an ordinary closure ring can be used. In particular, the closure ring has no perforation in its annular-disk-shaped contour. Preferably, the closure ring extends around or surrounds the outside of the slide bearing coaxially relative to the central longitudinal axis. In particular, the closure ring serves to close the joint housing and/or the recess in the housing. In this case there can already be some closing in the sense of the present application if, by means of the closure ring, an opening of the ball joint and/or the joint housing is reduced or made smaller to the extent that the inner joint portion is retained reliably in the slide bearing. In particular, the closure ring serves to secure, preferably axially, the inner joint portion in the joint housing and/or in the housing recess. In that way the closure ring can prevent the inner joint portion from falling out and/or being pulled out from the joint housing, at least up to a predetermined pull-out force. Preferably, the closure ring is made of a metal. In particular, the closure ring is in the form of a separate and/or stand-alone component.

In the structure of the inner joint portion as a ball stud, the inner joint portion comprises a joint ball and a joint stud. In particular, the joint stud of the inner joint portion extends outward through an opening of the ball-bearing section and/or the housing recess. Preferably, the opening of the ball-bearing section and/or the housing recess makes it possible for the inner joint portion to undergo swiveling movements in the slide bearing or in the ball-bearing section. At the same time, the diameter of the opening can determine or define a maximum tilt angle of the inner joint portion relative to the central longitudinal axis. In particular, the opening has a diameter which is smaller than a maximum outer diameter of the joint ball. The opening of the ball-bearing section, and/or the joint stud, is/are preferably located on a side of the slide bearing facing away from the holding section.

In particular, the ball-bearing section completely fulfills the function of an otherwise usual separate bearing shell. In particular, the ball-bearing section partially encloses and/or surrounds the joint ball of the inner joint portion. In particular, an inside of the ball-bearing section is in contact with an outside of the joint ball. For this, at least in part the ball-bearing section has a hollow spherically shaped inside. In particular, the hollow spherically shaped inside of the ball-bearing section is designed to fit the outside of the joint ball. Owing to the particular partial enclosing and/or surrounding of the joint ball by the ball-bearing section, the inner joint portion or the joint ball is held in the ball-bearing section in a form-enclosed manner. The ball-bearing section, in particular its at least partially hollow spherically shaped inner side, can extend starting from an end and/or pole surface of the joint ball in the direction toward the joint stud of the inner joint portion, beyond an equator of the joint ball.

Preferably the ball joint, the slide bearing and/or the closure ring are made rotationally symmetrical or substantially rotationally symmetrical relative to the central longitudinal axis. The central longitudinal axis can extend through a mid-point of the in particular ball-like or spherically shaped joint ball of the inner joint portion.

In the context of the present application the expression "radial" can denote a direction or any direction that extends perpendicularly to the axis direction of the ball joint, the inner joint portion and/or the central longitudinal axis of the slide bearing. Furthermore, the expression "axial" can denote a direction or any direction that extends parallel to the axial direction of the ball joint, the inner joint portion and/or the central longitudinal axis of the slide bearing.

In particular, a movable and/or articulated fit of the inner joint portion in the slide bearing is understood to mean that it can move by swiveling, tilting and/or rotating. Preferably, an articulated connection does not allow any translational movement of the inner joint portion relative to the slide bearing and/or the joint housing. "Tilting" of the inner joint portion means in particular a movement of the inner joint portion relative to the slide bearing and/or the joint housing in which a change of an angle between the central longitudinal axis and a longitudinal axis of the inner joint portion takes place. Preferably, the tilting takes place about a mid-point of the inner joint portion, preferably a mid-point of the joint ball of the inner joint portion. In particular, "rotation" of the inner joint portion means a movement of the inner joint portion in which, relative to the slide bearing and/or the joint housing, the inner joint portion rotates about the central longitudinal axis and/or about the longitudinal axis of the inner joint portion.

The one-piece slide bearing with the ball-bearing section and the holding section is in particular produced by an injection-molding process in a single production step. The sensor element can be held or fixed onto the slide bearing by means of the holding section. The sensor element can co-operate with a further sensor element to form a sensor device. For example, the said further sensor element can be associated with and/or arranged on the inner joint portion, in particular the joint ball. Preferably the further sensor element is in the form of a magnet. In particular, by means of the sensor device the position of the inner joint portion in the ball joint and in relation to the joint housing and/or the central longitudinal axis of the slide bearing is determined. For example, a corresponding sensor device can be designed as an angle sensor device. For this, the sensor element can comprise a Hall sensor for co-operating with the magnet of the joint ball.

According to a further design, the circular ring-shaped contact surface is formed at least in part by an annular projection of the slide bearing. In this case the said annular projection extends radially relative to the central longitudinal axis, outward from the outside of the slide bearing. In particular, a maximum outer diameter of the slide bearing is defined or determined by the annular projection. Preferably, the annular projection is part of the integrally made slide bearing. Furthermore, the annular projection can engage in a correspondingly shaped rabbet of the joint housing and/or the joint recess. The rabbet can be in the form of a step on an inner side of the joint recess. Preferably, the slide bearing is pressed into the joint recess. In that case the pressing-in ends as soon as the annular projection encounters the rabbet or step-like contour on the inside of the housing recess, in the axial direction relative to the central longitudinal axis.

In a further development, the closure ring projects over an outside of the slide bearing, in particular, over the annular projection of the slide bearing, radially outward relative to the central longitudinal axis. Then, a radially outer rim of the closure ring is fixed with interlock in a groove shaped to correspond to the said outer rim. In particular, the groove is part of the joint housing. In that case the groove can be formed on an inside of the joint recess. In that way, by means of the closure ring the slide bearing is fixed or secured in the axial direction relative to the central longitudinal axis. In this case, for the interlocked fixing of the closure ring and the final formation of the groove for holding the outer rim of the closure ring, a housing rim of the joint housing can be folded over once the closure ring has been positioned on the circular contact surface of the slide bearing. That deformation can be done, for example, by a so-termed flanging operation.

Preferably, a side of the closure ring directed radially inward is in contact with a cylindrical surface of the outside of the slide bearing. In particular, the said inward-directed side of the closure ring faces away from the radially outer rim of the closure ring. Preferably, the cylindrical surface extends coaxially with the central longitudinal axis and/or perpendicularly from or to the circular contact surface and also to the cylindrical surface of the slide bearing. Thus, the closure ring is in contact both with the circular contact surface and also with the cylindrical surface of the slide bearing. In this case the circular contact surface and the cylindrical surface are parts of the outside of the slide bearing.

According to a further embodiment, immediately adjacent to the contact surface the cylindrical surface has an annular groove. In particular, the said groove is formed coaxially with the central longitudinal axis of the slide bearing. Into the groove there is fitted a sealing element, in particular an O-ring. Preferably, the sealing element co-operates with the radially inward-directed side of the closure ring. In particular, by virtue of the closure ring the sealing element is pressed into the annular groove. By means of the sealing element, unwanted penetration of dirt and/or moisture into the ball joint and/or the slide bearing can be avoided.

According to a further development, the holding section of the slide bearing is made ring-shaped. In particular, the holding section has an essentially circular ring-shaped outer periphery. Preferably, the holding section has at least one web extending radially outward relative to the central longitudinal axis, which co-operates with at least one correspondingly shaped detent hook of the sensor element to form a snap-on and/or detent-type connection for the detachable fixing of the sensor element onto the holding section. In particular a plurality of detent hooks is arranged relative to one another in such manner that an annular or circular structure is formed. Alternatively, the plurality of detent hooks can be arranged in annular or circular segments relative to one another. Preferably, by virtue of the plurality of detent hooks an at least partially annular or circular outer contour of the sensor element is formed. Preferably, the sensor element is of plug-like design. A first end of the sensor element can be fitted onto the holding section by means of the snap-on or detent-type connection. A second end of the sensor element remote from the first end can or will be connected to an evaluation unit by way of a conducting lead.

In a further embodiment a seal, in particular an O-ring, is arranged coaxially and in the axial direction relative to the central longitudinal axis between the holding section and the sensor element. In particular, the seal is surrounded and/or enclosed by at least one or more detent hooks of the sensor element. By means of the seal any penetration of dirt or moisture between the sensor element and the slide bearing can be prevented.

According to a further development, at its outer circumference the sensor element has a ring-shaped or ring-segment-shaped securing element. The securing element acts upon the sensor element with a clamping and/or spring force directed radially inward relative to the central longitudinal axis. By virtue of the securing element any undesired and unintended detachment of the sensor element from the holding section of the slide bearing can be effectively prevented. In particular, the securing element acts with its radially inward-directed clamping and/or spring force upon at least one or more detent hooks of the sensor element. Thus, by means of the securing element the snap-on and/or detent-type connection between the sensor element and the holding section can be made more secure. Preferably, the one or more detent hook(s) has/have a channel on its/their outside. The securing element is held at least partially in the said channel. In particular, the plurality of channels is orientated coaxially with the central longitudinal axis relative to one another and form, together, a ring-like combination in which the securing element is held at least partially. The securing element can be in the form of a round-wire ring, a clamping ring or an O-ring. In this case it can be sufficient for the securing element to form an annular segment and thus not to be made as a complete ring.

Preferably, the holding section comprises at least one aligning section for the correctly orientated arrangement of the sensor element on the holding section. In particular, the said aligning section ensures a given orientation of the sensor element on the holding section. Thus, by virtue of the aligning section a particular position of the sensor element relative to the slide bearing is ensured. In particular, the aligning section co-operates with a correspondingly shaped fitting section of the sensor element. Preferably, the aligning section of the holding section and the fitting section of the sensor element co-operate with one another in an interlocking manner. The aligning section can be in the form of a cut-out in the annular holding section. A correspondingly shaped fitting section of the sensor element can fit into the said cut-out. Preferably, the aligning section has two cut-outs opposite one another in the annular holding section. In that case the fitting section of the sensor element is designed such that to arrange the sensor element on the holding section the fitting section fits into both of the cut-outs. Alternatively, the aligning section can be in the form of at least one elevation on the outer circumference of the annular holding section. In particular the said elevation is in the form of a projection or nose. The fitting section corresponding thereto can have a contour which, when the sensor element is positioned on the holding section, receives and/or at least partially surrounds the said elevation.

According to a further development, the annular holding section has a plurality of reinforcing ribs directed radially inward relative to the central longitudinal axis. The reinforcing ribs can have a ramp-like shape. In that case a height, in particular a height of the ramp-like reinforcing ribs, looking in the axial direction relative to the central longitudinal axis, can decrease starting from an inner side of the holding section and radially in the direction toward the central longitudinal axis. The said reinforcing ribs ensure better shape stability of the slide bearing, particularly its holding section.

Particularly advantageous is a method for producing a ball joint according to the invention, in which, taking into account a specified main angular deflection direction of the inner joint portion relative to the joint housing, the slide bearing is pressed correctly aligned into a housing recess of the joint housing. Owing to the aligned arrangement of the slide bearing in the housing recess, the orientation of the—only later to be fitted—sensor element is already predetermined. In this case, by virtue of the press-fitting of the slide bearing into the housing recess it is ensured that the slide bearing cannot rotate about the central longitudinal axis. After the slide bearing has been pressed into position, a separate closure ring is pressed in so as to fix the slide bearing axially. In particular, during this the closure ring comes into contact with the circular-ring-shaped contact surface and the cylindrical surface on the outside of the slide bearing. Thereafter, a housing rim of the joint housing is folded over in order to fix the closure ring with interlock. In particular, a radially outer rim of the closure ring is set firmly into a groove of the joint housing produced by the said deformation. After that, the sensor element is fixed into the holding section with an alignment relative to the joint housing which is predetermined by the holding section and in particular by its aligning section.

In particular, the ball joint made in accordance with the method according to the invention is a ball joint according to the invention as described earlier. Preferably, the method is developed further in accordance with the designs explained in connection with the ball joint according to the invention, as described herein. Furthermore, the ball joint described herein can be developed further in accordance with the designs explained in connection with the said method.

BRIEF DESCRIPTION OF THE DRAWINGS

In what follows, the invention will be explained in greater detail with reference to the figures, in which the same indexes denote the same, similar or functionally equivalent components. The figures show.

DETAILED DESCRIPTION

Figure 1:
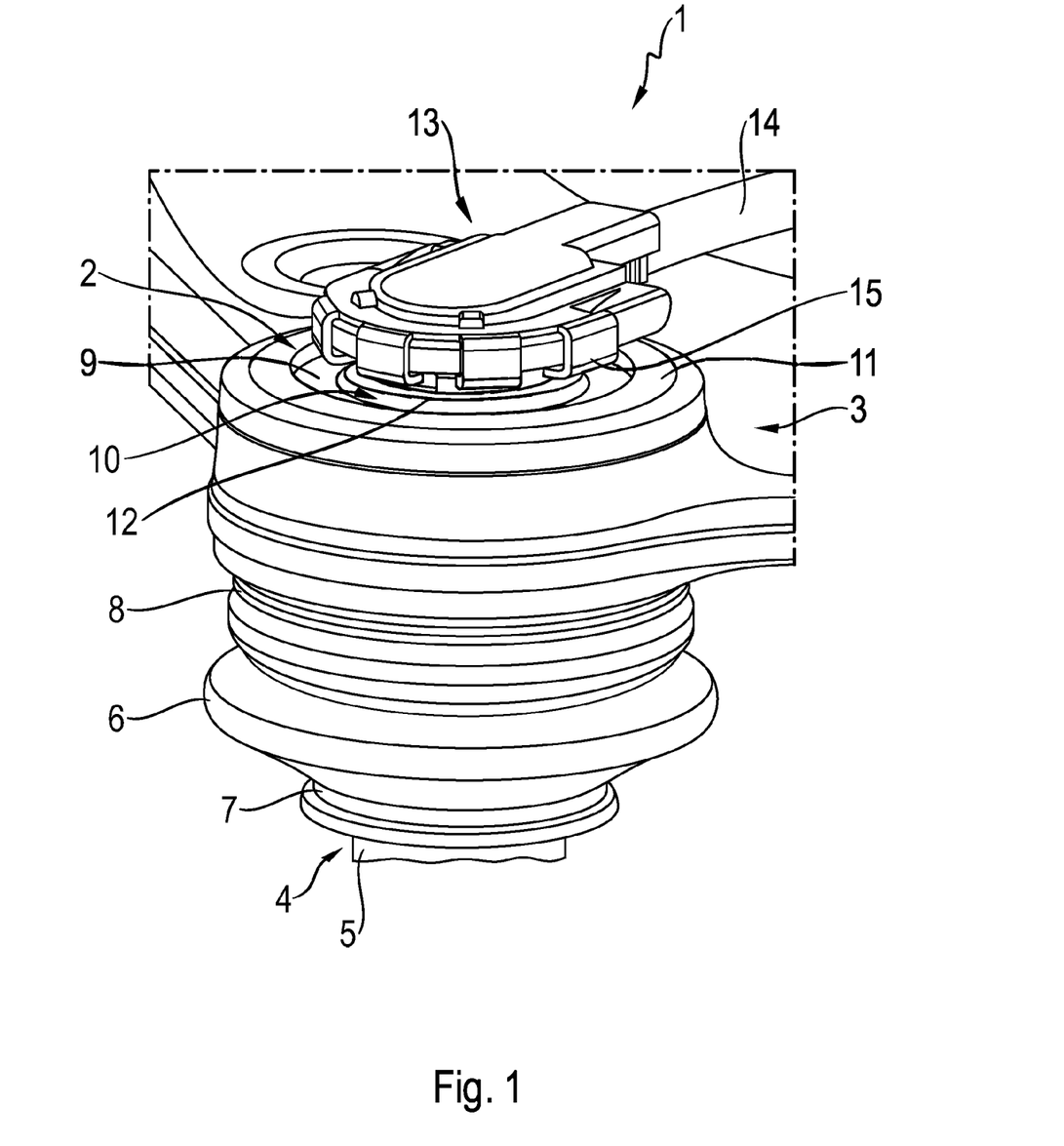
FIG. 1: Part of a perspective side view of a first ball joint according to the invention.

FIG. 1 shows part of a perspective side view of a first ball joint 1 according to the invention. In this example embodiment the ball joint 1 is in the form of a ball-and-socket joint. Moreover, the ball joint 1 is arranged in a housing recess 2 of a joint housing 3. In this example embodiment the joint housing 3 is an integral part of a chassis component, the chassis component being in this case for example a control arm.

The ball joint 1 comprises an inner joint portion 4. In this case the inner joint portion 4 is in the form of a ball stud. Correspondingly, the inner joint portion 4 comprises a joint stud 5 which extends outward from the joint housing 3. To seal the ball joint 1, this has a sealing bellows 6. The sealing bellows 6 extends between the joint stud 5 and the joint housing 3. Here, the sealing bellows 6 is secured on the joint stud side and also on the joint housing side by means of spring rings 7 and 8, respectively onto the joint stud 5 and the joint housing 3.

On the side remote from the joint stud 5 the joint recess 2 is closed by a closure ring 9 and a slide bearing 10. In this case, the closure ring 9 is fixed into the joint recess 2 by a deformed housing rim 11. Through a central opening of the closure ring 9 a holding section 12 of the slide bearing 10 extends outward.

A sensor element 13 is arranged and fixed on the holding section 12. In this example embodiment the sensor element 13 is essentially of plug-like form. Starting from the sensor element 13 a conducting lead 14 extends to an evaluation device (not shown). The sensor element 3 is fitted onto and held on the holding section 12 in the axial direction relative to the central longitudinal axis 19, by means of a snap-on and/or detent-type connection. For that purpose, the sensor element 13 has a plurality of detent hooks 15. For greater clarity, not all the detent hooks 15 are provided with an index. The plurality of detent hooks 15 are spaced uniformly apart. Furthermore, in this example embodiment the plurality of detent hooks 15 are arranged in a semicircle relative to one another. Thus, the detent hooks 15 at the same time form part of the outer circumference of the sensor element 13 that faces away from the conducting lead 14.

Figure 2:
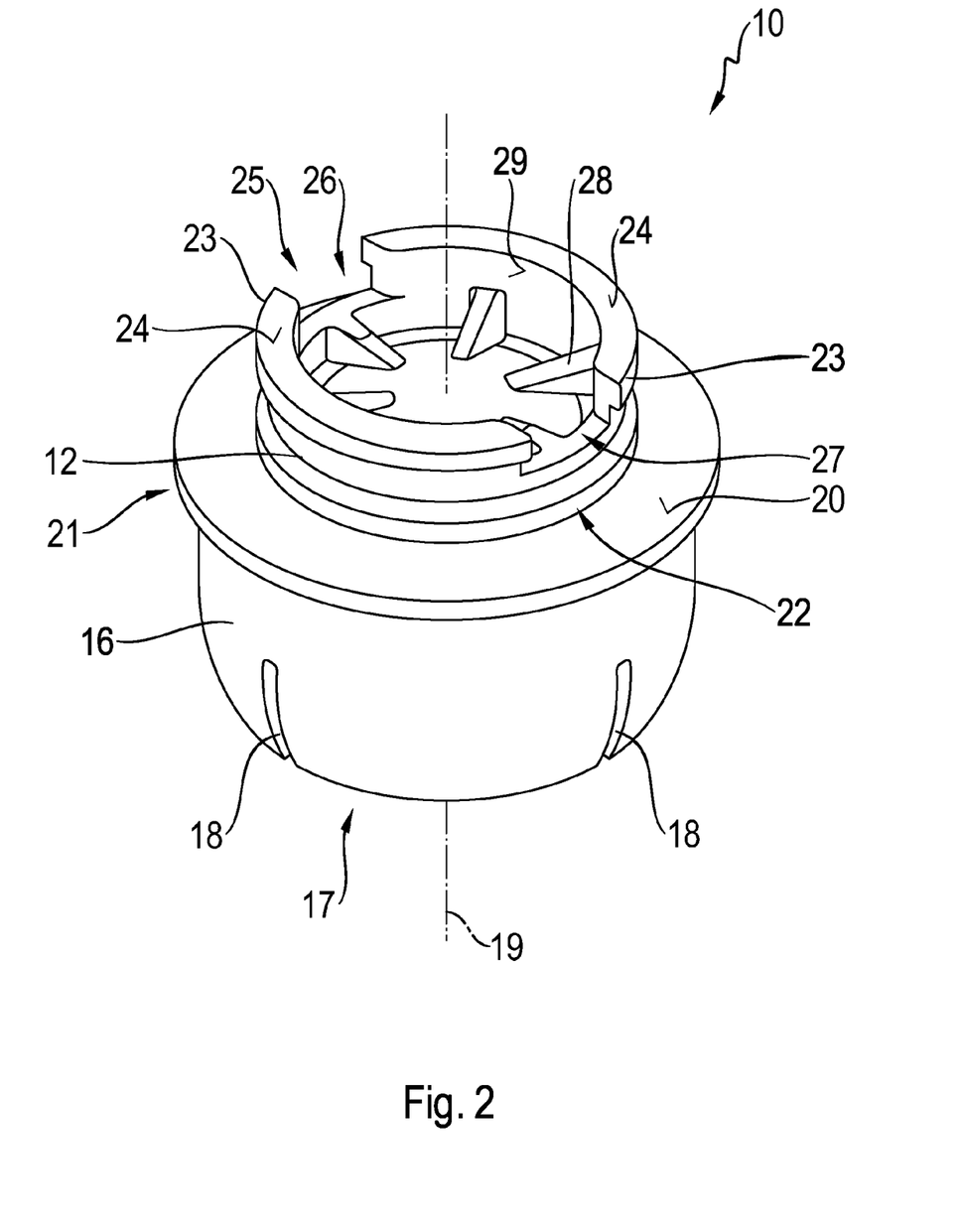
FIG. 2: A perspective side view of a slide bearing for the first ball joint according to the invention shown in FIG. 1, FIG. 3: A sectioned side view of the first ball joint according to the invention shown in FIG. 1, FIG. 4: Part of a perspective side view of a further ball joint according to the invention.

FIG. 2 shows a perspective side view of the slide bearing 10 for the first ball joint 1 according to the invention, as shown in FIG. 1. The slide bearing 10 is formed by the holding section 12 and a ball-bearing section 16. On the side facing away from the holding section 12, the ball-bearing section 16 has an opening 17. Through that opening 17 the inner joint portion 4 shown in FIG. 1 extends outward. The ball-bearing section 16 has a plurality of slots 18. The plurality of slots 18 are arranged uniformly spaced in the circumferential direction of the ball-bearing section 16. Furthermore, starting from the opening 17 the slots 18 extend parallel to a central longitudinal axis 19 of the slide bearing 10. The slots 18 extend approximately to an equatorial area of the ball-bearing section 16. In this example embodiment the ball-bearing section 16 has a total of four slots 18.

On its outside the slide bearing 10 has a circular ring-shaped contact surface 20. The contact surface 20 is coaxial with the central longitudinal axis 19 and extends radially toward the central longitudinal axis 19. Furthermore, the contact surface 20 faces away from the ball-bearing section 16 and toward the holding section 12. The holding section 12 is in the form of a ring, such that the holding section 12 has a smaller outer diameter than the contact surface 20. In this case the holding section 12 is arranged centrally relative to the contact surface 20 and the central longitudinal axis 19.

The circular ring-shaped contact surface 20 is formed at least partially by an annular projection 21 of the slide bearing 10. The annular projection 21 extends outward, relative to the central longitudinal axis 19, from the outside of the slide bearing. Thus, the projection 21 defines or determines a maximum outer diameter of the slide bearing 10.

The holding section 12 has a cylindrical surface 22 which extends coaxially relative to the central longitudinal axis 19 and, in this example embodiment, perpendicularly away from the circular ring-shaped contact surface 20.

To position the sensor element 13 on the holding section 12 as in FIG. 1, the holding section comprises a web 23 projecting outward radially relative to the central longitudinal axis 19. In this example embodiment the holding section 12 has two webs 23. In this example embodiment the two webs 23 are in the form of circular ring segments arranged mirror-symmetrically relative to one another. At the same time the webs 23 form in each case an end face 24 of the holding section 12. The end faces 24 face away from the ball-bearing section 16 in the axial direction relative to the central longitudinal axis 19.

The holding section 12 has an aligning section 25 for the aligned arrangement of the sensor element 13 on the holding section 12 shown in FIG. 1. The aligning section 25 in this example embodiment is formed by two cut-outs 26, 27 opposite one another. By virtue of the said cut-outs 26, 27 the two webs 23 are separated from one another.

The holding section 12 is essentially ring-shaped and has a plurality of reinforcing ribs 28 directed radially inward relative to the central longitudinal axis 19. For the sake of greater clarity, not all the reinforcing ribs 28 are indexed. The reinforcing ribs 28 are in each case ramp-like. In this case the height of the ramp-like reinforcing ribs 28 decreases, starting from an inside 29 of the holding section 12, radially in the direction toward the central longitudinal axis 19.

Figure 3:
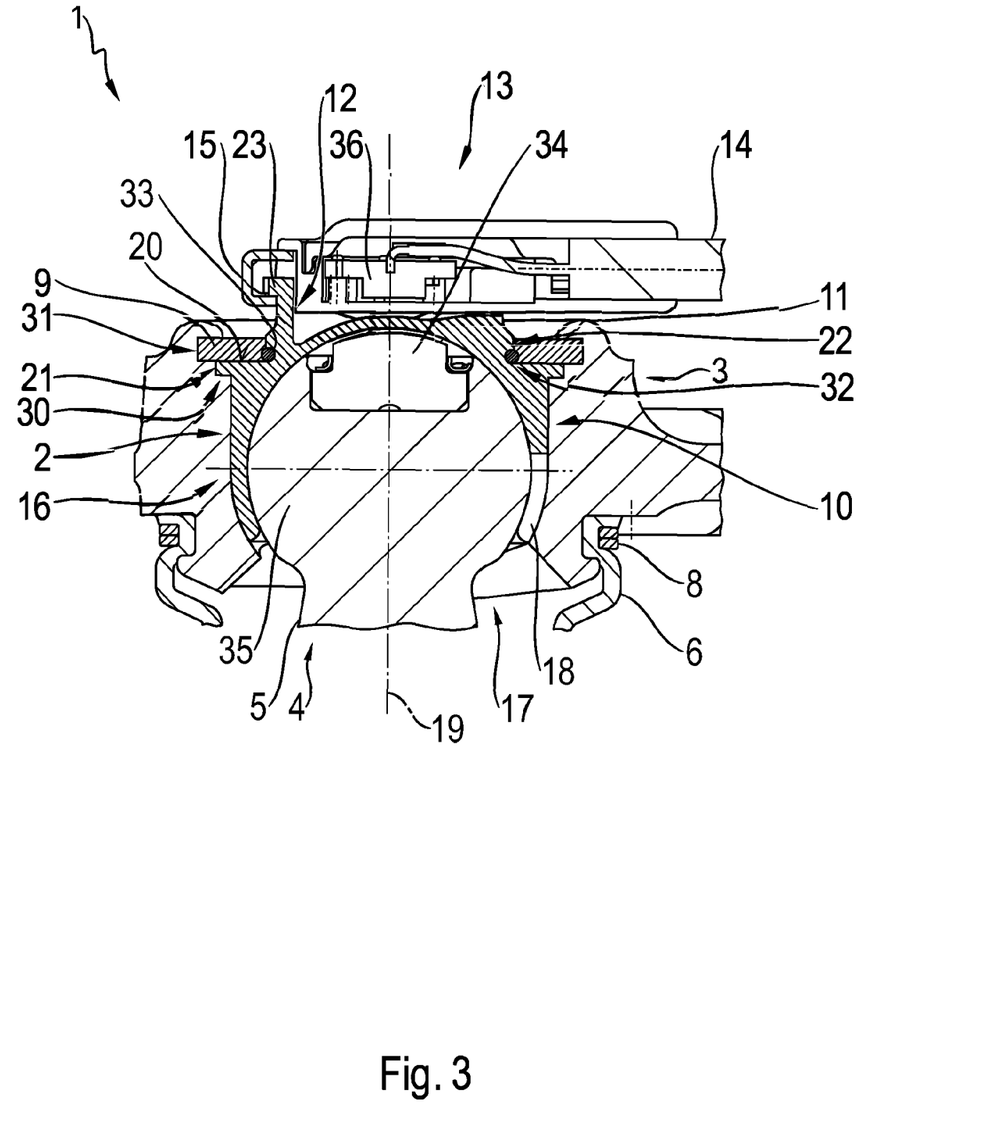

FIG. 3 shows a sectioned side view of the first ball joint 1 according to FIG. 1. The annular projection 21 of the slide bearing 10 engages in a correspondingly shaped rabbet 30 of the joint housing 3 or the housing recess 2. In this example embodiment the rabbet 30 is of step-like form.

The closure ring 9 extends over an outside of the slide bearing 10, radially toward the central longitudinal axis 19. In this case a radially outer rim of the closure ring 9 is set with interlock into a groove 31 designed to correspond to the outer rim of the closure ring 9. The groove 31 is annular and is arranged or formed on the inside of the housing recess 2. The shape of the groove 31 is produced after the closure ring 9 has been inserted and the housing rim 11 has been folded over in such manner that the configuration shown is obtained.

The cylindrical surface 22 of the holding section 12 has an annular groove 32 immediately adjacent to the contact surface 20. Into the said groove 32 is fitted a sealing element 33. In this example embodiment the sealing element 33 is in the form of an O-ring. The sealing element 33 co-operates with the radially inward-directed side of the closure ring 9. By virtue of the sealing element 33, unwanted penetration of dirt and/or moisture into the ball joint 1 is prevented.

In this example embodiment the sensor element 13 is designed to co-operate with a further sensor element 34. The sensor element 13 and the further sensor element 34 form a sensor device. In this example embodiment the said further sensor element 34 is a magnet and is integrated in a joint ball 35 of the inner joint portion 4. The joint ball 35 is fitted into the ball-bearing section 16 in such manner that it can swivel. The further sensor element 34 is arranged in an area of the joint ball 35 that faces away from the joint stud 5 and toward the holding section 12.

In this example embodiment the sensor element 13 comprises a Hall sensor 36. Thus, in this example embodiment the sensor device formed by the sensor element 13 and the further sensor element 34 is in the form of an angle sensor device, by means of which the position of the inner joint portion 4 can be determined relative to the joint housing 3 or the slide bearing 10.

The slide bearing 10, which consists of the holding section 12 and the ball-bearing section 16, is made integrally from a plastic material. The closure ring 9 is metallic. The joint housing 3 and the associated chassis components are also metallic.

Figure 4:
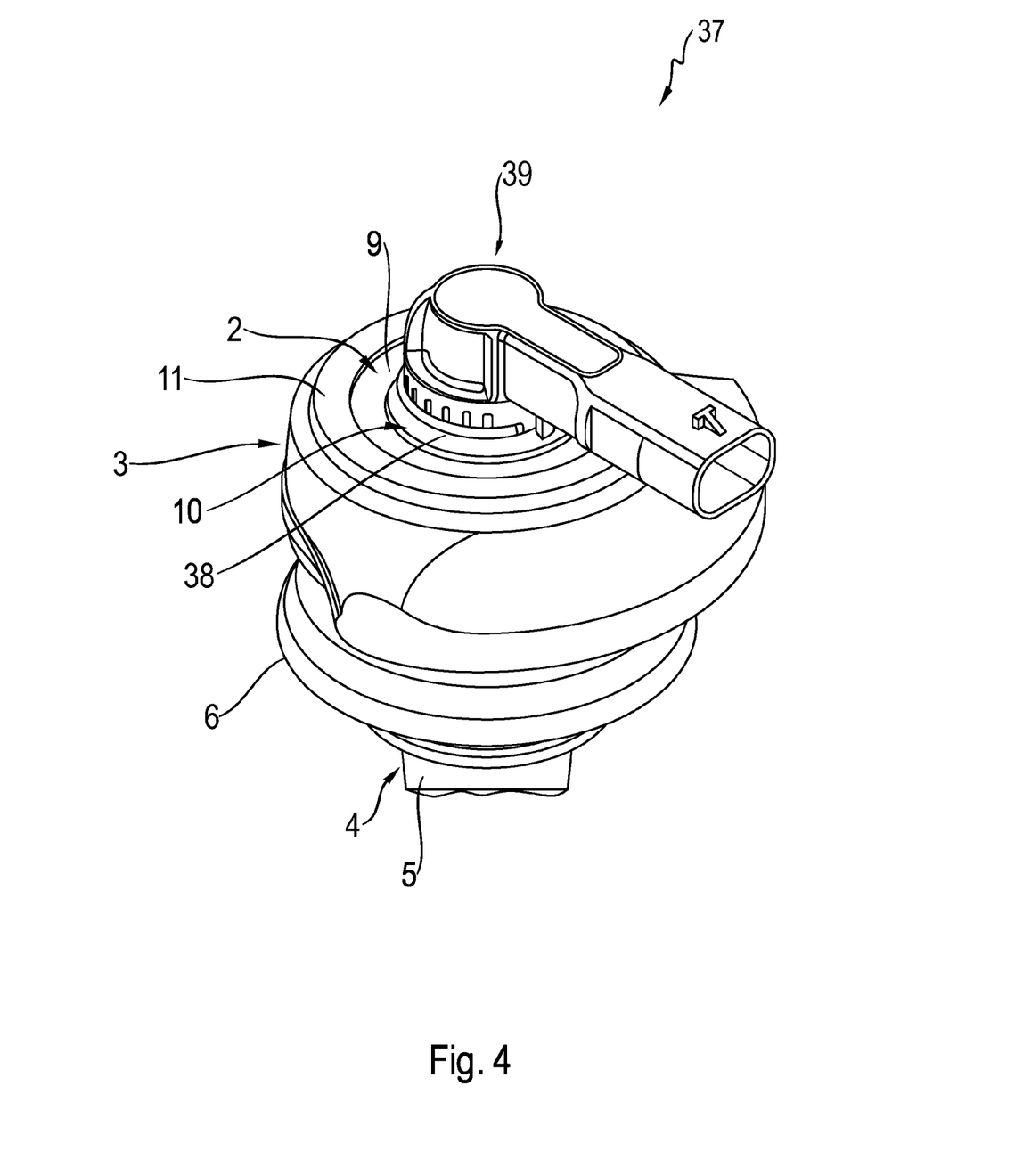

FIG. 4 shows part of a perspective side view of a further ball joint 37 according to the invention. The same features as before are given the same indexes. To that extent reference is also made to the previous description. Like the ball joint 1 according to FIGS. 1 to 3, the ball joint 37 is also in the form of a ball-and-socket joint. Correspondingly, an inner joint portion 4 in the form of a ball stud is arranged in a joint recess 2 of a joint housing 3. In this example embodiment the slide bearing 10 has a holding section 38 onto which a sensor element 39 is attached with a snap-on and/or detent-type connection. The structure of the holding section 38 and the sensor element 39 will be described in greater detail with reference to the figures that follow.

Figure 5:
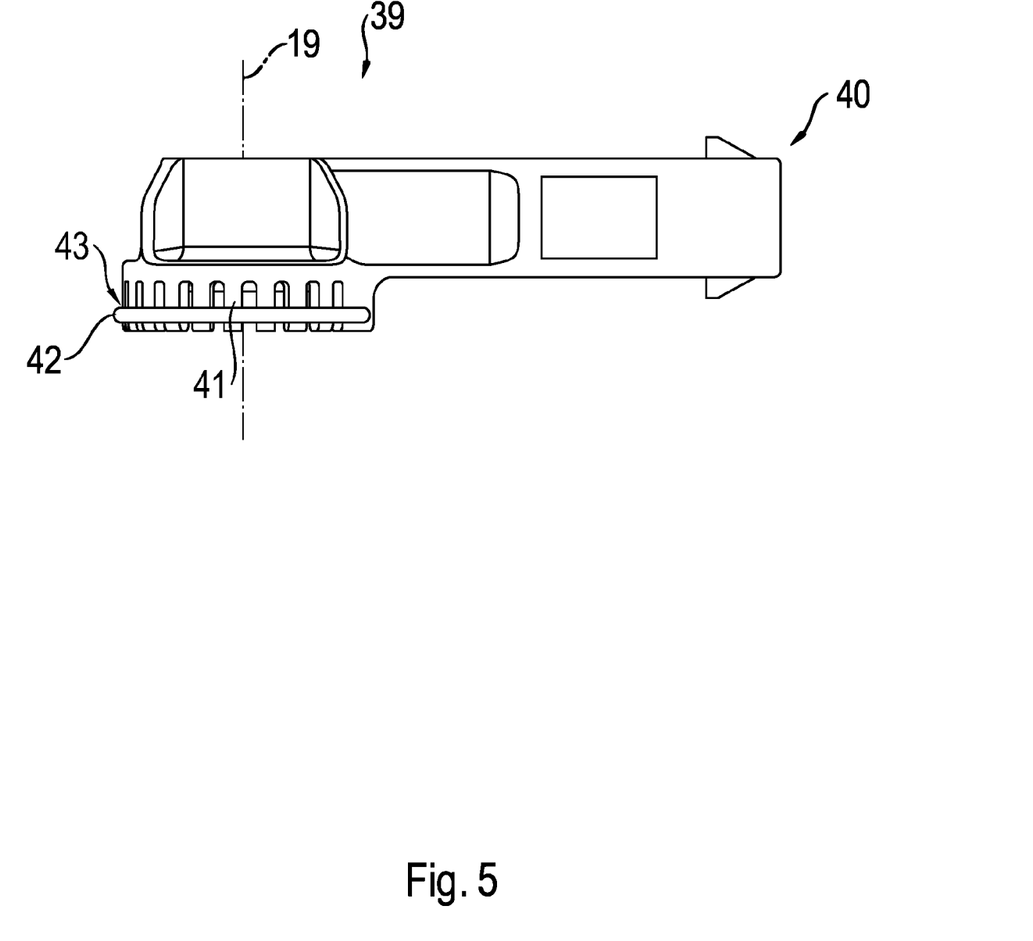
FIG. 5: A side view of a sensor element for the further ball joint according to the invention shown in FIG. 4, FIG. 6: A sectioned side view of the further ball joint according to the invention shown in FIG. 4, FIG. 7: Part of the sectioned side view of the further ball joint according to the invention shown in FIG. 6, FIG. 8: Part of a further, partially sectioned side view of the further ball joint according to the invention shown in FIG. 4, and FIG. 9: Part of a perspective side view of the further ball joint according to the invention, without the sensor element.

FIG. 5 shows a side view of the sensor element 39 for the further ball joint 37 according to the invention shown in FIG. 4. Like the sensor element 13 according to FIGS. 1 to 3, the sensor element 39 is designed as a plug-in element. A free end 40 of the sensor element 39 can be connected by a conducting lead (not shown) to an evaluation unit. To position the sensor element 39 on the holding section 38 as in FIG. 4, the sensor element has a plurality of detent hooks 41. For better clarity, not all the detent hooks 41 are indexed. The plurality of detent hooks 41 are uniformly spaced apart and together they form a circular-ring-like or circular-ring-segment-like configuration.

In addition, in this example embodiment, in the area of the detent hooks 41 the sensor element 39 has at its circumference an annular or circular-ring-segment-like securing element 42. The securing element 42 surrounds or embraces the plurality of detent hooks 41, with the securing element 41 on an outside of the detent hook 41 in each case. In this case the securing element 42 acts upon the sensor element 39 or the detent hooks 41 with a clamping or spring force directed radially toward the central longitudinal axis 19. In that way the snap-on and/or detent-type connection between the sensor element 39 and the holding section 38 according to FIG. 4 is additionally secured.

On the outside the detent hooks 41 have in each case a channel 43. The securing element 42 is held at least partially in the said channels 43, and thereby correctly positioned on the detent hooks 41.

Figure 6:
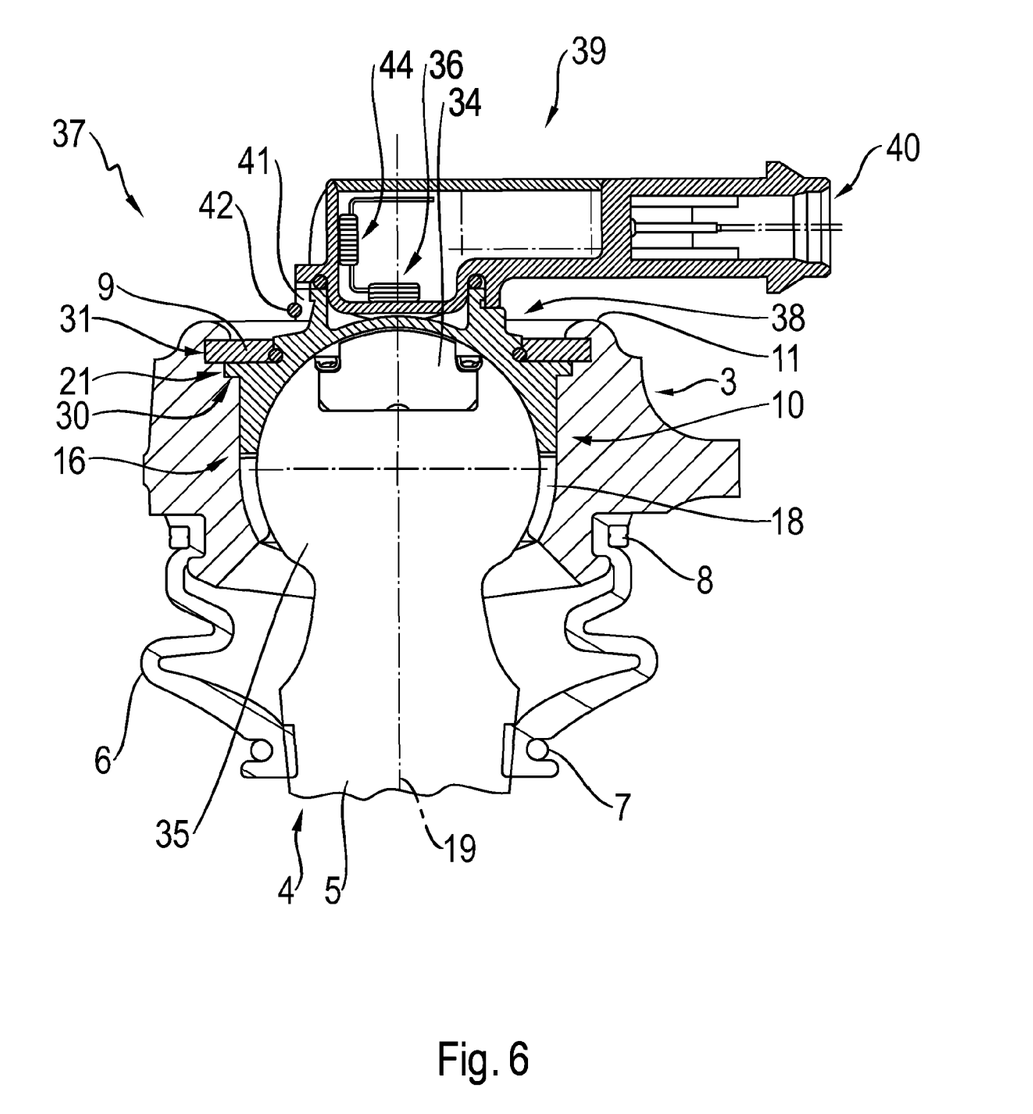

FIG. 6 shows a sectioned side view of the further ball joint 37 according to the invention, as shown in FIG. 4. In addition to the holding section 38, the slide bearing 10 comprises the ball-bearing section 16. The ball-bearing section 16, the projection 21, the closure ring 9 and its co-operation with the joint housing 3 and the joint housing recess 2, and also the rim 11 of the housing, correspond to what was said about the ball joint 1 shown in FIG. 1. Accordingly, reference should be made to the previous description.

In this case too, the sensor element 39 co-operates with a further sensor element 34 in the form of a magnet in the joint ball 35 of the inner joint portion 4. For this, the sensor element 39 again comprises a Hall sensor 36. In this example embodiment, starting from the Hall sensor 36, an electronic assembly 44 is arranged parallel to the central longitudinal axis 19. If it is desired, in an alternative embodiment, to have a flatter sensor element 39 in the axial direction relative to the central longitudinal axis 19, then the electronic assembly 44 can be arranged not parallel to, but at an angle relative to the central longitudinal axis 19. For example, the electronic assembly 44 can be arranged at an angle of 65° or even 90° relative to the central longitudinal axis 19.

Figure 7:
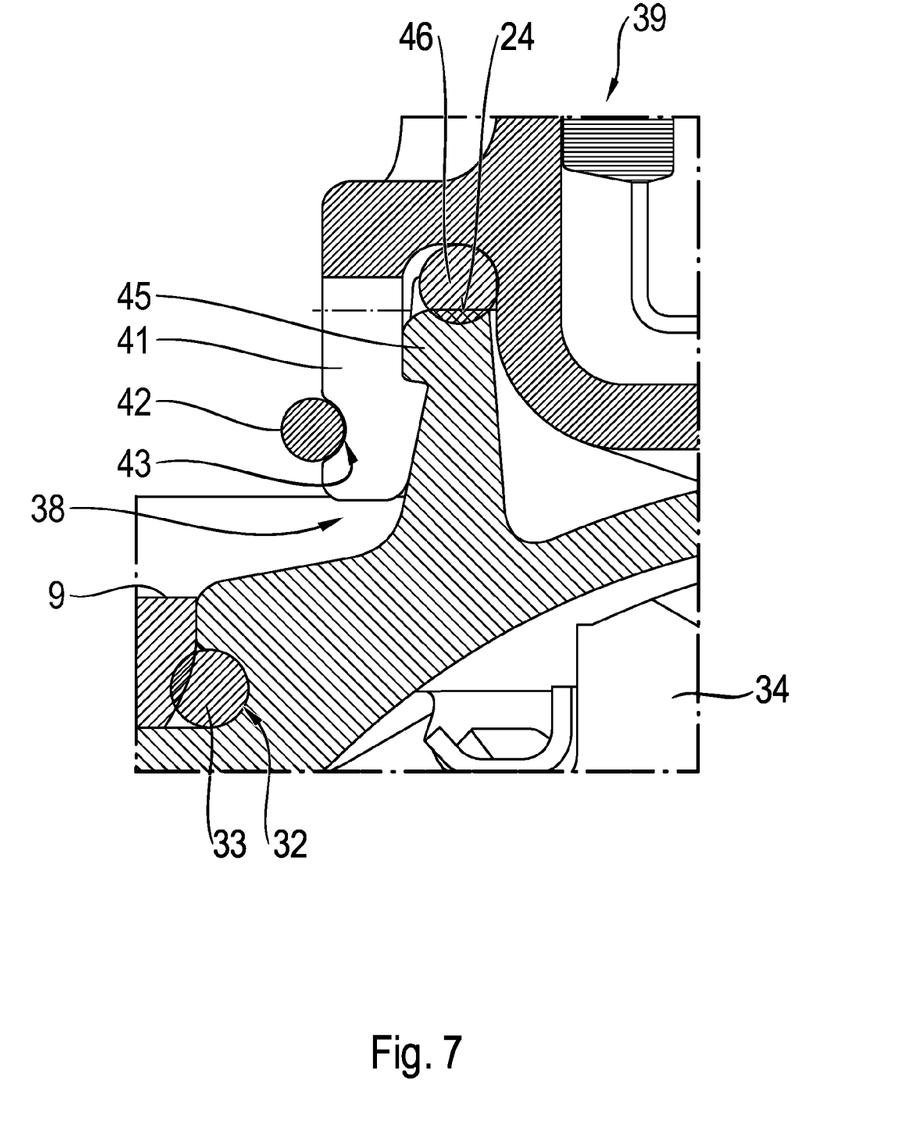

FIG. 7 shows part of the sectioned side view of the further ball joint 37 according to the invention, as shown in FIG. 6. The holding section 38 is essentially annular and has a web 45 projecting outward relative to the central longitudinal axis 19 according to FIG. 6. The web 45 co-operates with the plurality of detent hooks 41 of the sensor element 39 to form the snap-on and/or detent-type connection for the detachable attaching of the sensor element 39 to the holding section 38. For that purpose, the detent hooks 41 are at least partially directed radially inward, in order to co-operate with the radially outward-directed web 45 in an interlocking manner.

Coaxially, and in the axial direction relative to the central longitudinal axis 19, according to FIG. 6, a seal 46 is arranged between the holding section 38 and the sensor element 39. In this example embodiment, the seal 46 is in the form of an O-ring. Moreover, the seal 46 is surrounded or embraced by the plurality of detent hooks 41. In the area of the seal 46, and in order to hold the seal 46, the holding section 38 has an essentially U-shaped cross-section. In this case the seal 46 is supported on the end face 24 of the web 45. By means of the seal, any penetration of dirt and/or moisture between the sensor element 39 and the slide bearing 10 or the holding section 38 is prevented.

Figure 8:
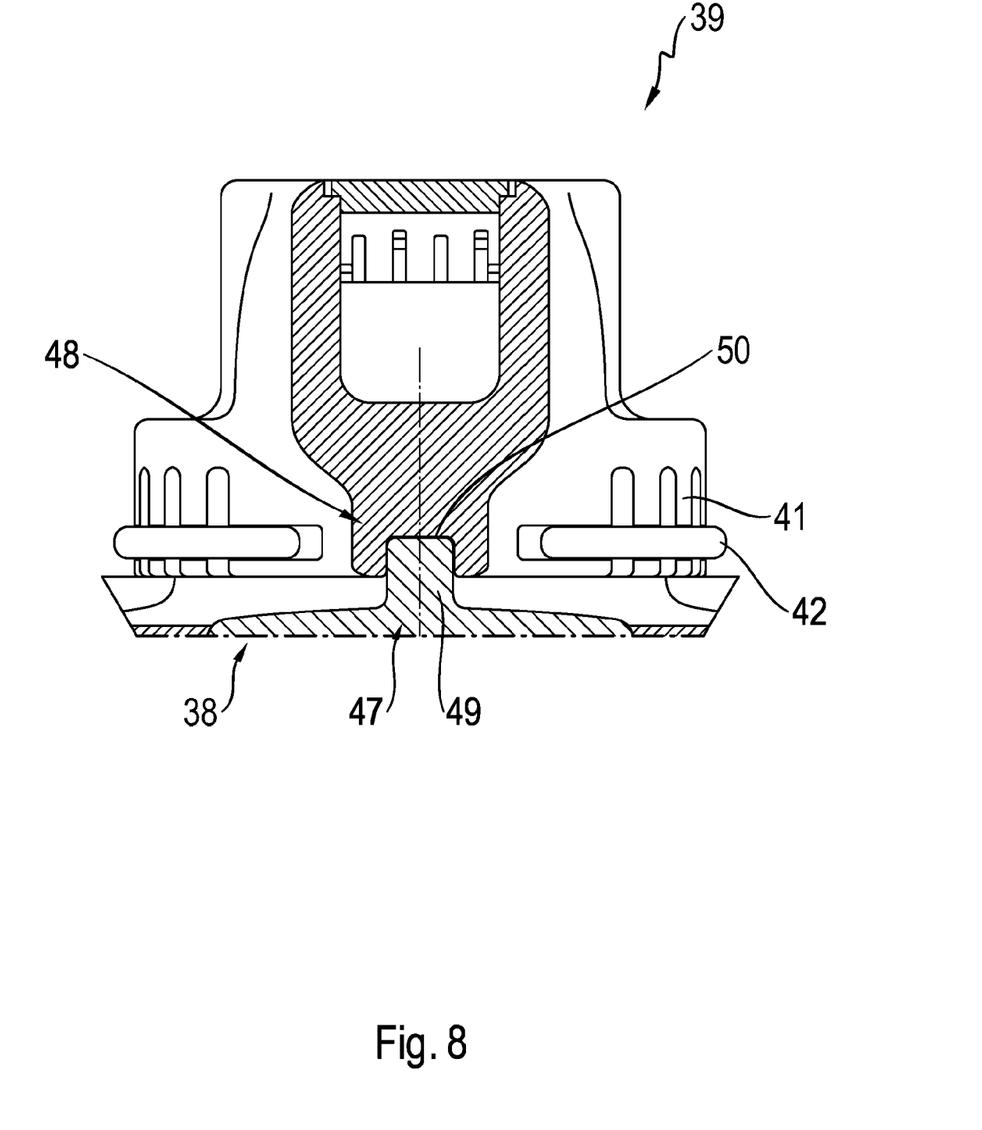

FIG. 8 shows part of a further, partially sectioned side view of the further ball joint 37 according to the invention shown in FIG. 4. In this case the viewing direction is from the free end 40 of the sensor element 39 toward the snap-on and/or detent-type connection between the sensor element 39 and the holding section 38. In this example it can be seen that the holding section 38 comprises an aligning section 47 for ensuring a correctly aligned arrangement of the sensor element 39 on the holding section 38. The aligning section 47 co-operates with a correspondingly shaped fitting section 48 of the sensor element 39. In this example embodiment the aligning section 47 is formed by a projection-like elevation 49. In this example embodiment the fitting section 48 has a recess 50 shaped to correspond to the elevation 49, in which the elevation 49 engages. By virtue of the co-operation between the aligning section 47 and the fitting section 48, the orientation of the sensor element 39 is predetermined relative to the slide bearing 10 or to the joint housing 3, according to FIG. 6.

Figure 9:
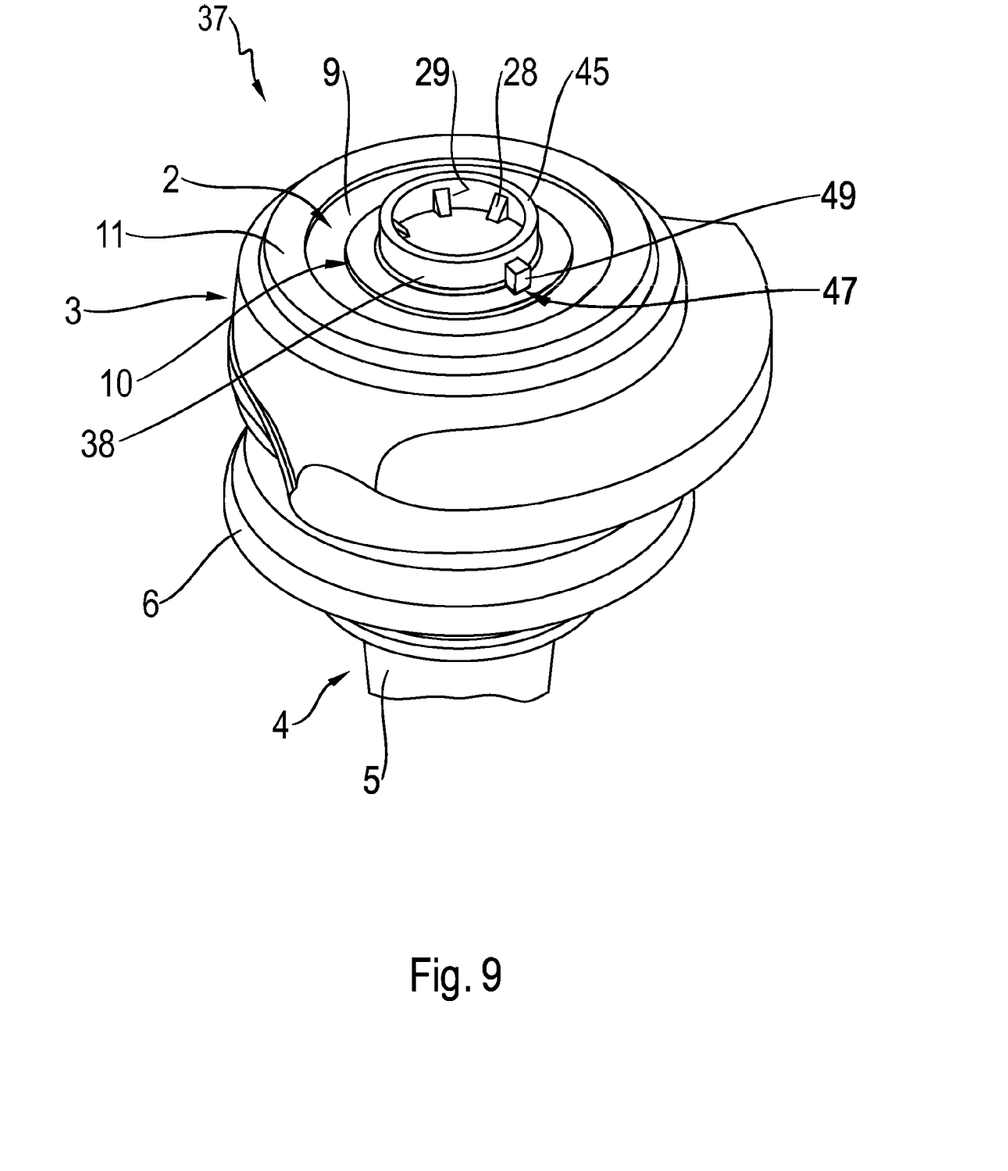

FIG. 9 shows part of a perspective side view of the further ball joint 37 according to the invention, without the sensor element 39. Here, the circular-ring-like web 45 and the aligning section 47 with the projection-like elevation 49 extending radially outward can be seen clearly. As with the holding section 2 according to FIG. 2, the holding section 38 also has a number of reinforcing ribs 28 which are of ramp-like shape and which extend, starting from the inside 29, radially toward the central longitudinal axis 19.

To produce the ball joint 1 or 37, the slide bearing 10 is pressed into the housing recess 2 of the joint housing 3, with an orientation that takes into account a predetermined main angular deflection direction of the inner joint portion 4 relative to the joint housing 3. In this case the pressing-in of the slide bearing 10 takes place with the opening 17 facing forward in the axial direction of the central longitudinal axis 19. The pressing-in process ends as soon as the projection 21 of the slide bearing 10 encounters the step-like rabbet 30 of the joint housing 3 or the housing recess 2. Then, the separate closure ring 9 is pressed into place in order to fix the slide bearing 10 axially in the housing recess 2. In this case the closure ring 9 is pressed in the axial direction defined by the central longitudinal axis 19 toward the slide bearing 10 until the closure ring 9 encounters the contact surface 20 of the slide bearing 10. At the same time a radially inward-directed side of the closure ring 9 encounters the cylindrical surface 22. Thereafter, the housing rim 11 is folded over in order to fix the closure ring 9 in place in a form-enclosed manner. This creates the groove 31 in which the radially outer rim of the closure ring 9 is fixed with interlock. Finally, the sensor element 13 or 39 is fixed onto the holding section 12 or 38 in the orientation relative to the joint housing 3 determined by means of the holding section 12 or 38. In this case, the predetermined orientation of the sensor element 13 or 39 is defined by the aligning section 25 or 47 of the holding section 12 or 38. In turn, the orientation of the aligning section 25 or 47 is already determined by the orientation of the slide bearing 10 when it is pressed in.

INDEXES

1 Ball joint
2 Housing recess
3 Joint housing
4 Inner joint portion
5 Joint stud
6 Sealing bellows
7 Spring ring
8 Spring ring
9 Closure ring
10 Slide bearing
11 Housing rim
12 Holding section
13 Sensor element
14 Conductor
15 Detent hook
16 Ball-bearing section
17 Opening
18 Slot
19 Central longitudinal axis
20 Contact surface
21 Projection
22 Cylindrical surface
23 Web
24 End face
25 Aligning section
26 Cut-out
27 Cut-out
28 Reinforcing rib
29 Inner side
30 Rabbet
31 Groove
32 Annular groove
33 Sealing element
34 Further sensor element (magnet)
35 Joint ball
36 Hall sensor
37 Ball joint
38 Holding section
39 Sensor element
40 Free end
41 Detent hook
42 Securing element
43 Channel
44 Electronic assembly
45 Web
46 Channel
47 Aligning section
48 Fitting section
49 Elevation
50 Recess

The invention claimed is:

1. A ball joint for a chassis of a vehicle, the ball joint comprising:
an inner joint portion with a joint ball; and
a one-piece slide bearing made of plastic, the one-piece slide bearing having a ball-bearing section and a ring-like holding section, wherein an outside of the slide bearing has an annular contact surface formed coaxially relative to a central longitudinal axis of the slide bearing;
a sensor element on the ring-like holding section of the one-piece slide bearing;
a closure ring defining a central opening and encircling an outer face of the slide bearing, the closure ring engaging the annular contact surface and having a radially inwardly directed face that bears against a cylindrical surface of the outer face, wherein the ring-like holding section of the slide bearing extends outward through the central opening of the closure ring, and wherein the cylindrical outer surface extends coaxially with the central longitudinal axis and/or at a right angle from and/or to the annular contact surface; and
a joint housing;
wherein the joint ball of the inner joint portion is fitted so that it can swivel in the ball-bearing section of the slide bearing; and
wherein the annular contact surface in an axial direction relative to the central longitudinal axis, co-operates with the closure ring in the joint housing to fix the slide bearing in the joint housing.

2. The ball joint according to claim 1, wherein the annular contact surface is formed at least in part by an annular projection, wherein the annular projection extends radially outward relative to the central longitudinal axis from the outside of the slide bearing, and wherein the annular projection engages in a correspondingly shaped rabbet defined by the joint housing.

3. The ball joint according to claim 1, wherein the closure ring extends over the outside of the slide bearing radially outward relative to the central longitudinal axis, and a radially outer rim of the closure ring is fixed with interlock in a groove shaped to correspond to the said outer rim.

4. The ball joint according to claim 1, wherein the cylindrical surface defines an annular groove immediately adjacent to the annular contact surface and into which a sealing element is fitted such that the sealing element co-operates with the radially inward-facing side of the closure ring.

5. The ball joint according to claim 1, wherein the sensor element has at least one detent hook with a shape corresponding to the at least one web, wherein the holding section has at least one web extending outward radially relative to the central longitudinal axis, wherein the at least one web co-operates with the at least one detent hook of the sensor element to form a snap-on and/or detent-type connection for the detachable fixing of the sensor element onto the holding section.

6. The ball joint according to claim 1, wherein the sensor element has one or more detent hooks, and the ball joint further comprising a seal positioned coaxially with and in the axial direction relative to the central longitudinal axis, between the holding section and the sensor element, wherein the seal is surrounded and/or embraced by the one or more detent hooks of the sensor element.

7. The ball joint according to claim 1, wherein an outer circumference the sensor element has an annular securing element configured to provide a clamping or spring force on the sensor element, wherein the spring force is directed radially inward toward the central longitudinal axis to secure a snap-on and/or detent-type connection between the sensor element and the holding section.

8. The ball joint according to claim 7, wherein the holding section has at least one aligning section configured to align the sensor element on the holding section, such that the at least one aligning section co-operates with a correspondingly shaped fitting section of the sensor element, and wherein the aligning section is formed by at least one cut-out in the holding section or by at least one elevation arranged on an outer circumference of the holding section.

9. The ball joint according to claim 7, wherein the sensor element comprises one or more detent hooks.

10. The ball joint according to claim 9, wherein each of the one or more detent hooks defines a channel in an outside surface, wherein a portion of the securing element is at least partially held in the channel.

11. The ball joint according to claim 1, wherein the holding section has an annular shape with a plurality of reinforcing ribs directed radially inward relative to the central longitudinal axis, and wherein each of the plurality of reinforcing ribs is ramp-shaped, such that a height of each of the plurality of reinforcing ribs decreases, starting from an inside of the holding section, radially in the direction of the central longitudinal axis.

12. A method for producing the ball joint according to claim 1, the method comprising:
taking into account a predetermined main angular deflection direction of the inner joint portion relative to the joint housing;
pressing, after alignment, the slide bearing into a housing recess of the joint housing;
pressing the closure ring onto the joint housing in order to fix the slide bearing axially;
folding over a rim of the housing in order to fix the closure ring in an interlocked manner; and
fitting the sensor element onto the holding section in an orientation relative to the joint housing which is predetermined by virtue of the holding section.

13. The ball joint according to claim 1, wherein the sensor element comprises a magnet.

14. The ball joint according to claim 1, wherein the sensor element is configured as a Hall sensor.

* * * * *